Patented Apr. 17, 1923.

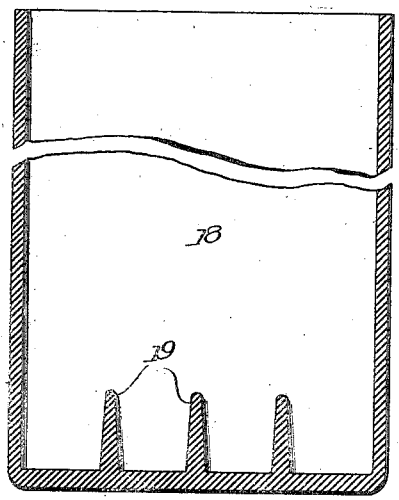
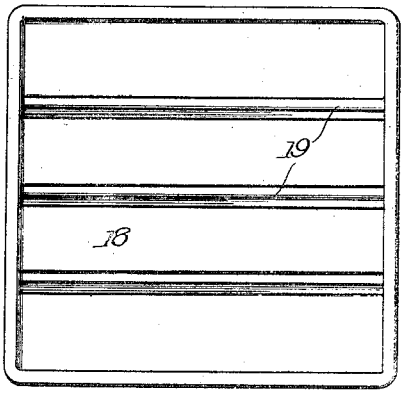
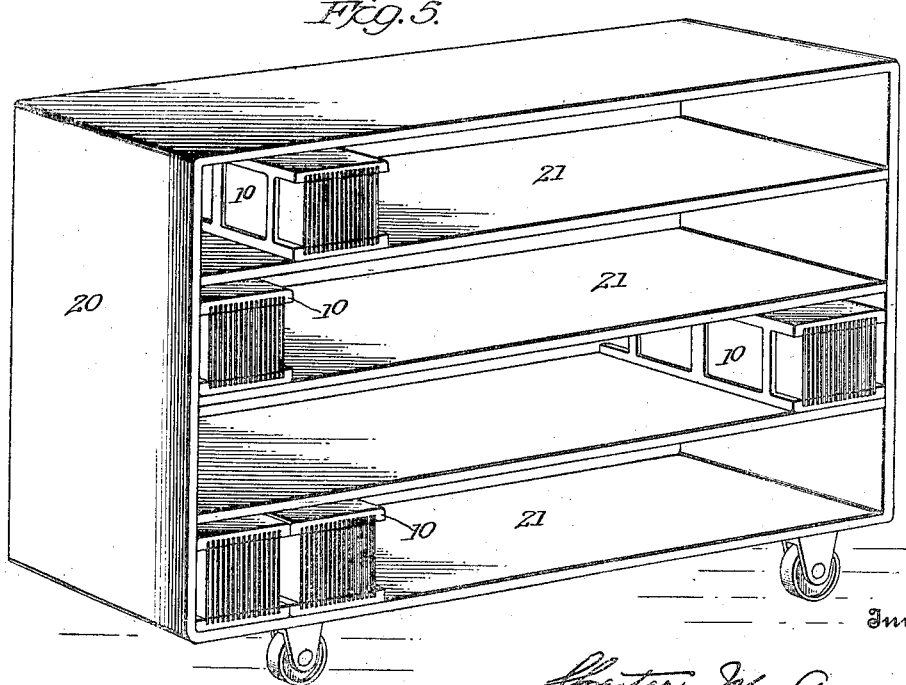

1,451,801

UNITED STATES PATENT OFFICE.

CHESTER M. ANGELL, OF CHICAGO, ILLINOIS, ASSIGNOR TO VESTA BATTERY CORPORATION, OF CHICAGO, ILLINOIS, A CORPORATION OF ILLINOIS.

PROCESS FOR HANDLING, DRYING, AND FORMING PASTED BATTERY PLATES.

Application filed April 1, 1922. Serial No. 548,785.

*To all whom it may concern:*

Be it known that I, CHESTER M. ANGELL, a citizen of the United States, residing at Chicago, in the county of Cook and State of Illinois, have invented certain new and useful Improvements in Processes for Handling, Drying, and Forming Pasted Battery Plates, of which the following is a specification.

This invention relates to a method of and means for handling battery plates during that part of the process of manufacture which is subsequent to the operation generally known as "pasting" and prior to that usually referred to as "burning".

The steps of manufacture which must be completed between the two aforementioned stages are, first, a thorough drying of the plates; second, assembly of the plates into temporary groups suitable for forming; third, the formation of these groups into positive and negative plates, respectively, by the use of electric current; and finally, the disassembly of the temporary plate groups and the drying of the individual plates.

The method just outlined is susceptible of various modifications and among these, the use of a specially ribbed jar adapted to contain plates during formation in spaced relation (thus dispensing with forming separators) is well known in the art. However, before and after the forming operation in the ribbed forming jar the plates are separately handled, assembled and separated.

It is the principal object of the invention to provide a method of and means for handling battery plates in which the necessity of disassembling and re-assembling is eliminated.

It is the general object of the invention to provide means for carrying out the initial drying operation, the forming operation and the second drying operation of a purality of plates in a definitely assembled relation.

To facilitate the understanding of the invention, reference is made to the accompanying drawings in which—

Figs. 3 and 4 are a sectional view and a plan view, respectively, of a jar forming another part of the arrangement; and Fig. 5 is a perspective view of another frame preferably used in connection with the invention.

Figure 1:
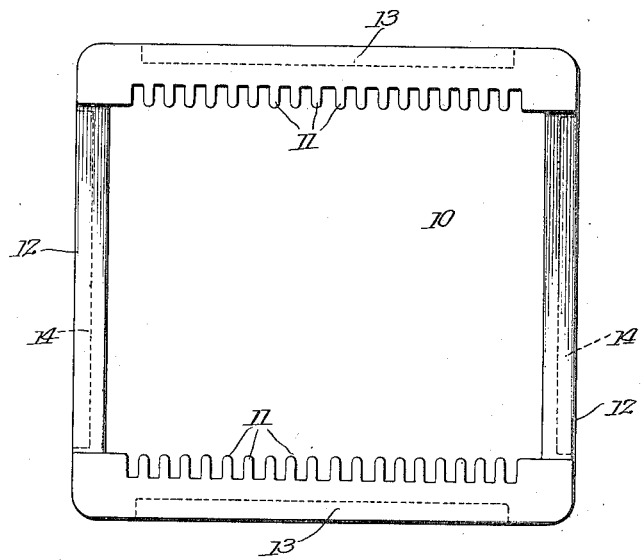
Fig. 1 is an end view of a frame element forming a part of the arrangement for carrying out the object of the invention.
Figure 2:
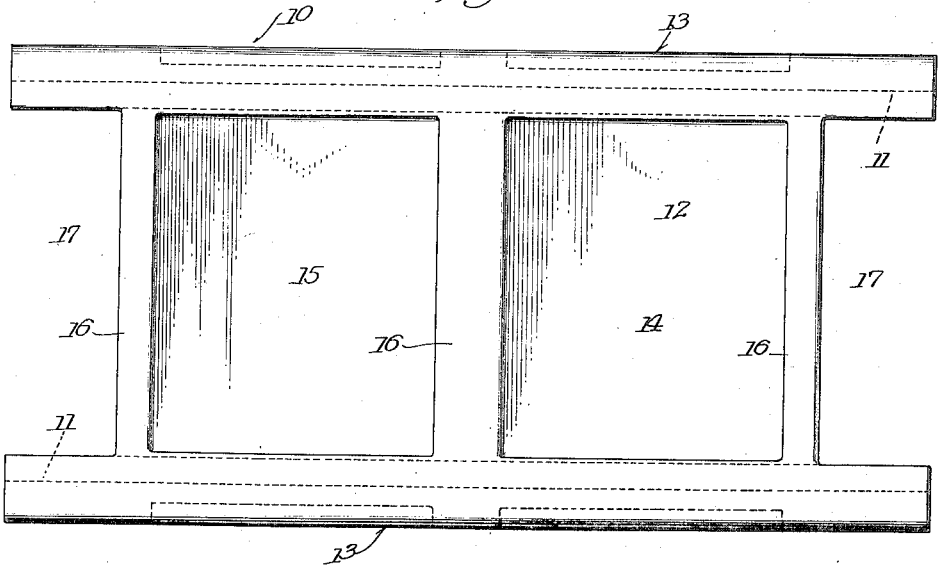
Fig. 2 is a side view thereof.

In the drawings the frame 10 has the form of a box, open at both ends and provided on the inner top and bottom surfaces with ribs 11 forming a rack for holding plates in spaced relation.

While there is considerable latitude in other respects, the frame 10 is preferably made of hard rubber and is formed to combine mechanical strength with lightness. To this end the relatively thick walls have recesses 14 and 15 defining ribs 16. The side walls 12 do not extend to the extreme ends but define with the top and bottom walls 13 cut out portions 17.

The jar 18 has a cross-sectional area to loosely receive the frame 10 and its height is slightly in excess of the length thereof. At the bottom are ribs 19.

The use of the elements so far described is as follows:

The freshly pasted plates are slipped into the racks of frames 10 and the frames are loaded in tiers in a horizontal position upon trucks. As soon as a truck has been loaded it can be hauled away for drying, which operation may be accomplished by simple exposure to the air in the room since the plates are now spaced at intervals in the racks. For the purpose of illustration reference is had to Fig. 5 in which 20 represents a truck of the order available for this purpose. The truck may have a plurality of shelves 21 for supporting the frames 10 in tiers.

The drying may, of course, be hastened by passing a stream of air through a row of trucks placed in alignment end to end or it may be further hastened by the use of heated air. The manner of drying does not form part of the invention. It should be noted, however, that the plates in the racks need not be disturbed in any case whatever the mode of drying may be.

When dry, the frames 10 are placed on a bench, where, still without disturbing the plates, metallic contact strips are soldered or otherwise attached to the projecting lugs of the positive and negative plates, respectively. An entire frame is then lowered into a forming jar 18 and the jars are then filled with electrolyte and placed in an electric charging circuit in the usual way.

The ends of the side walls 13 pass to the bottom of the jar between the outside ribs 19 and the adjacent walls of the jar and the plates rest on the ribs 19.

After completion of the charge, the connections between cells are broken, the plate frames 10 removed from the jars (all the plates still in their original position) and the plate frames containing the formed plates again placed in a position to dry. When dry, the plates are removed from the frames.

It is thus seen that not only is the drying carried out in both cases in a minimum of space and in systematic order, but the handling of the individual plates before and after the forming operation is entirely eliminated. The present method of handling the plates not only saves time but also avoids in a large measure injury to the plates. Due to the fact that the plates are contained in a frame and their position fixed relatively thereto, no more than ordinary care need be exercised in moving them from one place to another, while in handling individual plates the greatest care is necessary.

I claim:

1. In a process of manufacturing storage battery plates, the steps following the pasting operation which consist in assembling a plurality of pasted plates in fixed spaced parallel relation, drying the plates in that relation and subjecting the plates in that relation to the action of an electric current and an electrolyte.

2. In a process of manufacturing storage battery plates, the steps following the pasting operation which consist in assembling a plurality of pasted plates in fixed spaced parallel relation, subjecting the plates in that relation to the action of an electric current and an electrolyte and drying the plates in that relation.

3. In a process of manufacturing storage battery plates, the steps following the pasting operation which consist in assembling a plurality of plates in spaced relation in a frame, drying the pasted plates while in the frame, subjecting the plates while in the frame to the action of an electric current and an electrolyte and again drying the plates while in the frame.

4. In a process of manufacturing storage battery plates, the steps following the pasting operation which consist in assembling a plurality of plates in spaced relation in a frame, drying the pasted plates while in the frame, forming contact strips on the plates while in the frame and then subjecting the plates to the action of an electric current and an electrolyte.

In testimony whereof, I affix my signature.

CHESTER M. ANGELL.